Figure 1:
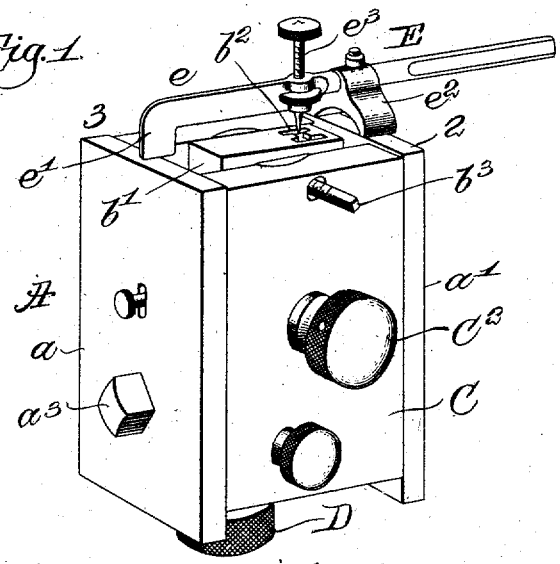

No. 12,545. REISSUED OCT. 23, 1906.

H. C. HANSEN.

MATRIX TRUING APPARATUS.

APPLICATION FILED APR. 26, 1905.

Witnesses.
Thomas J. Drummond
S. William Lutton.

Inventor.
Hans C. Hansen,
By Dissby & Greenway
Attys.

THE NORRIS PETERS CO., WASHINGTON, D. C.

UNITED STATES PATENT OFFICE.

HANS C. HANSEN, OF NEWTON, MASSACHUSETTS.

MATRIX-TRUING APPARATUS.

No. 12,545. Specification of Reissued Letters Patent. Reissued Oct. 23, 1906.

Original No. 727,355, dated May 5, 1903. Application for reissue filed April 26, 1905. Serial No. 257,554.

*To all whom it may concern:*

Be it known that I, HANS C. HANSEN, residing at Newton, in the county of Middlesex and State of Massachusetts, have invented an Improvement in Matrix-Truing Apparatus, of which the following description, in connection with the accompanying drawings, is a specification, like characters on the drawings representing like parts.

In the production of a matrix for casting type or characters for printing in a type-casting machine it is now customary to file the face of the matrix to a level and to then file or dress the sides of the matrix to bring them at right angles to the face thereof. This done, the face of the matrix outside of and about the character contained therein in intaglio must be further filed until said face is exactly parallel with the bottom of the impression representing the character and the sides redressed, if necessary.

I have aimed to facilitate the production of matrices and avoid hand-filing, which lessens the cost of their production.

In my invention I may take two plates of metal and insert in a hole in that one of said plates which is to form the face of the matrix the character formed in usual manner, preferably of a different metal from the plates, and I may secure said plates together in any usual or suitable way, or I may sink in one face of a metal bar in any usual manner the character desired. With a matrix formed in any usual manner, the manner of forming the same in the first instance being immaterial to my invention, I may apply the partially-formed matrix without any filing to an apparatus which I have devised to hold said matrix while its face is being finished mechanically parallel to the bottom surface of the intaglio character in the matrix, the finishing being done by a suitable tool of a metal-planer or similar machine.

I believe that I am the first to complete a matrix by a tool in a machine instead of by hand-filing, and I intend to cover, broadly, an apparatus for doing away with hand-filing whatever its construction.

My novel apparatus as herein shown in one of the best forms now known to me comprises an adjustable matrix-holder shaped externally so that it may be tipped in the direction of the length and width of the matrix, the holder for the best results being spherical. The holder is maintained frictionally in its adjusted position by a suitable clamp, and the holder has a notch to receive the matrix to be surfaced, suitable means coacting with the matrix in the notch to retain it firmly in the holder. The clamp is made adjustable, that it may be moved in a guide-frame toward and from the line occupied by the tool used to surface or plane the face of the matrix, and by tipping the holder any part of the face of the matrix may be placed with relation to the path of the tool used to remove any part of the matrix which is not truly parallel with the entire bottom surface of the intaglio impression in the matrix.

Figure 3:
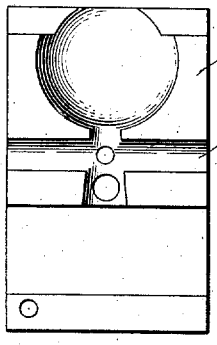
Figure 2:
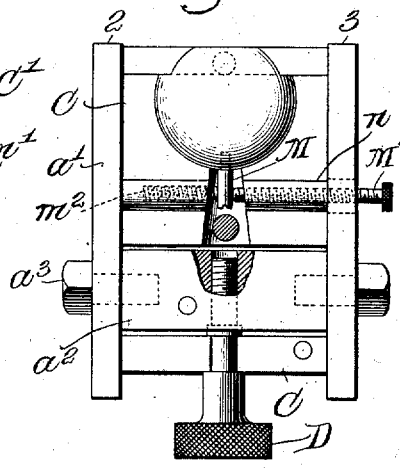
Figure 4:
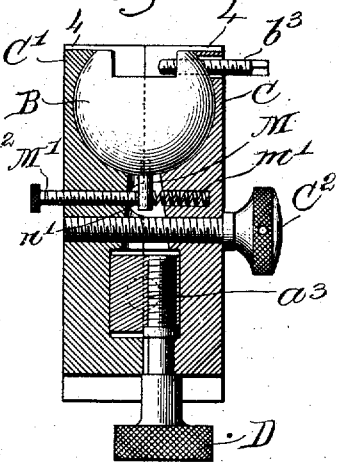
Figure 5:
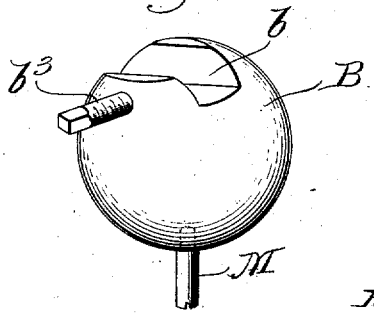

Figure 1, in perspective, shows the clamp, the frame containing it, the matrix-holder containing a matrix, and a depth-gage applied in position to detect any difference in level between the bottom surface of the impression in the matrix and the face of a testing-surface. Fig. 2 is a view showing some of the parts represented in Fig. 1, a part of the clamp and the gage being omitted. Fig. 3 is an inner side view of the part of the clamp left off from Fig. 2. Fig. 4 is a vertical section of the parts shown in Fig. 1 with the gage and matrix-holder omitted. Fig. 5 shows one form of matrix-holder in perspective.

Referring to the drawings, A represents a guide-frame composed of two like plates $a$ $a'$, presenting parallel ends 2 3 and a connected bar $a^2$, (see Figs. 2 and 4,) the plates and bar being firmly united by suitable screws $a^3$, the ends 2 and 3 constituting testing-surfaces, to be described.

The matrix-holder which I have herein chosen to illustrate is composed, essentially, of a sphere or ball B. (Shown in elevation in Fig. 4 and detached in Fig. 5.) The matrix-holder has a suitable notch $b$, in which may be laid the matrix $b'$, having in its face a character, as $b^2$, in intaglio, the character herein shown representing the letter "H." The matrix having been laid in the notch $b$ is secured therein firmly in any suitable manner, as by a set-screw $b^3$. The matrix referred to is sustained in a suitable clamp composed, as shown, of two plates C C', each having a concaved portion to fit the exterior of the matrix-holder. The two plates are clamped firmly together by a suitable screw, as $C^2$, so that by their friction they will prevent any movement of the matrix-holder.

It is necessary at times to move the clamp and the matrix-holder longitudinally with relation to the guide-frame $a$ $a'$. To effect this adjustment, that the face of the matrix may be placed exactly in position with relation to the surfacing-tool of usual construction, such as used in a planer or similar machine, I have provided an adjusting-screw D, which is shaped to turn freely in one member, as C, of the clamp and be restrained from longitudinal motion with relation to said clamp, the threaded end of the screw entering a screw-thread in the bar $a^2$, so that by rotation of the screw D the clamp may be moved longitudinally in the guide-frame and toward and from the path of movement of any suitable tool, as stated. After having secured the matrix in the matrix-holder by the screw $b^3$ the gage E, composed, essentially, of a bar $e$, having a downturned foot $e'$ and held adjustably in a double foot $e^2$ and provided with a feeler $e^3$, which is adjustable vertically with relation to said bar, is set upon the parallel ends 2 and 3 of the plates $a$ and $a'$ of the guide-frame A, said ends constituting a testing-surface, the double foot $e^2$ resting on one end, as 2, of one of said plates, the downturned end $e'$ resting on the opposite end 3 of the other plate. This done, the workman turns the feeler until its point meets the bottom surface of the impression or character made in the face of the matrix, and thereafter the feeler is further turned to raise the end $e'$ from the end 3 of the plate $a$, so that the workman may just discern the light between said end $e'$ and said end 3. In this condition he may move the gage by hand so that the point of the feeler will traverse all parts of the bottom surface of the character, and if one part or end of the impression is higher than another, the screw $C^2$ being slightly released, he tips the matrix-holder having the matrix fixed therein in one and another direction until the point of the feeler indicates that the bottom surface of the character is exactly at a level or exactly parallel to the ends 3 and 2 of the plates $a$ $a'$. When this is ascertained, the screw $C^2$ is set up, causing the clamp to hold the matrix-holder firmly in position, and portions of the face of the matrix will stand out of parallelism with the frame end surfaces 2 and 3 if the face and the bottom surface of the matrix were not originally parallel. The bottom surface of the matrix will also stand at exactly a given distance from the ends 2 3 or some other definite point on the frame from which the surfacing-tool is subsequently gaged, so that when the face of the matrix is planed off the matrix will be exactly of the proper depth. Thereafter while the guide-frame is held firmly and securely in a planer or similar machine the tool of the machine of usual form will be made to attack the face of the matrix, surface and smooth the same, leaving the face of the matrix exactly parallel with the bottom of the character formed in the matrix and of exactly the proper depth.

To adjust the matrix-holder accurately when the screw $C^2$ is sufficiently loosened to permit the matrix to be turned in any direction, I have provided the matrix-holder with a stud M, and through the plate $C'$, I have inserted a screw $M'$, that acts against one side of the stud, a spring $m'$ in the opposite plate C working against the opposite side of the stud. The inner side of the plate C is provided with a rib $n$, threaded to receive a screw $M^2$, that acts against a part of the stud ninety degrees distant from the point thereof acted upon by the screw $M'$, a suitable spring, as $m^2$, acting against said stud at a point opposite the end of said screw $M^2$. The screw $M^2$ is extended through an elongated slot in the side wall $a'$ of the guide. The inner side of the plate $C'$ is grooved at $n'$ to receive the rib $n$. By turning the screws $M'$ and $M^2$ the matrix-holder may be accurately adjusted into any desired position and be retained in such position.

By making the matrix-holder spherical and forming a notch therein for the reception of the matrix, as illustrated and described, I provide a very strong device capable of being readily and accurately adjusted and held in adjusted position, because with the matrix thus held within the periphery of the sphere the sphere can be made of such a large size as to be easily held frictionally by the clamp without too severe clamping and yet so as to remain locked in adjusted position when the matrix is being acted upon by the surfacing-tool under the heavy strain of the planing or other machine.

I have not herein considered it necessary to show the cutting-tool of a planer or the planer-bed upon which the guide-frame A will be fixedly held during the operation of the tool, as any one skilled in the art will readily understand how the guide may be fixed with relation to the bed and the tool may be made to act on the face of the matrix to plane the same to a true level.

Instead of surfacing the face of the matrix in a planing-machine having a traveling bed I may perform this work in any other equivalent machine.

I do not in the present application claim the gage shown herein, as this forms the subject of another and divisional application, filed January 3, 1903, Serial No. 137,656.

Having described my invention, what I claim as new, and desire to secure by Letters Patent, is—

1. In a matrix-truing apparatus, a matrix-holder provided with means for receiving and sustaining a matrix, truing-surfaces disposed adjacent thereto, a clamp for sustaining the matrix-holder, and means for adjusting the matrix-holder in the clamp to bring the matrix into truing position with respect to the truing-surfaces.

2. In a matrix-truing apparatus, a spherical matrix-holder provided with means for receiving and sustaining a matrix, truing-surfaces disposed adjacent thereto, a clamp for sustaining the matrix-holder, and means to tip the matrix-holder in the clamp both in the direction of the length and width of the matrix to bring the matrix into truing position with respect to the truing-surfaces.

3. In a matrix-truing apparatus, an adjustable matrix-holder provided with means for sustaining a matrix, means for sustaining the matrix-holder in desired adjustment, and truing-surfaces disposed adjacent the matrix-holder for determining the position of the matrix-holder in its sustaining means to bring the matrix into truing position.

4. In a matrix-truing apparatus, a matrix-holder provided with means for securing a matrix therein, means for sustaining said matrix-holder, plates on opposite sides thereof provided with testing-surfaces adjacent the matrix-holder, and devices for moving the matrix-holder with relation to the testing-surfaces.

5. In a matrix-truing apparatus, a plate having a truing-surface, a matrix-holder for sustaining a matrix, means for sustaining the matrix-holder, said plate being disposed adjacent to the matrix-holder, and devices to adjust the said sustaining means and matrix-holder with relation to the truing-surface to place the bottom of the character impression in the matrix parallel with the said surface.

6. In a matrix-truing apparatus, a matrix-holder for sustaining a matrix, a clamp for sustaining the matrix-holder, truing-surfaces disposed on opposite sides of said matrix-holder, means for adjusting the matrix-holder in the clamp, and devices for adjusting the clamp with respect to the truing-surfaces.

7. In a matrix-truing apparatus, the combination of a matrix-holder provided with a notch for holding a matrix, a clamp for sustaining the matrix-holder, two connected plates having testing-surfaces, means for adjusting the matrix-holder and the clamp with relation to the testing-surfaces of the connected plates.

8. A matrix-truing apparatus comprising a frame, a matrix-holder mounted in said frame, means supported by said frame for indicating the depth of the matrix, means for adjusting the matrix-holder in the frame to bring the bottom of the matrix into truing position.

9. A matrix-truing apparatus comprising a frame, a matrix-holder mounted in said frame, means supported by said frame and movable in fixed relation thereto for indicating the depth of the matrix at all points, means for adjusting the matrix-holder in the frame to bring the bottom of the matrix into truing position.

10. In a matrix-truing apparatus a spherical matrix-holder, means located within the periphery of the sphere to hold a matrix therein, a clamp to hold the sphere in adjusted position.

11. In a matrix-truing apparatus, a spherical matrix-holder formed to leave a portion of the sphere to sustain the matrix within the periphery of the sphere, means carried by said sphere for confining the matrix, and a clamp to hold the matrix in adjusted position.

In testimony whereof I have signed my name to this specification in the presence of two subscribing witnesses.

HANS C. HANSEN.

Witnesses:
NATHAN HEARD,
MABEL PARTELOW.